Aug. 4, 1936.                O. L. STARR                 2,049,673
CONTROL MEANS FOR HARVESTERS OR THE LIKE OPERATING MECHANISM
Filed April 6, 1934
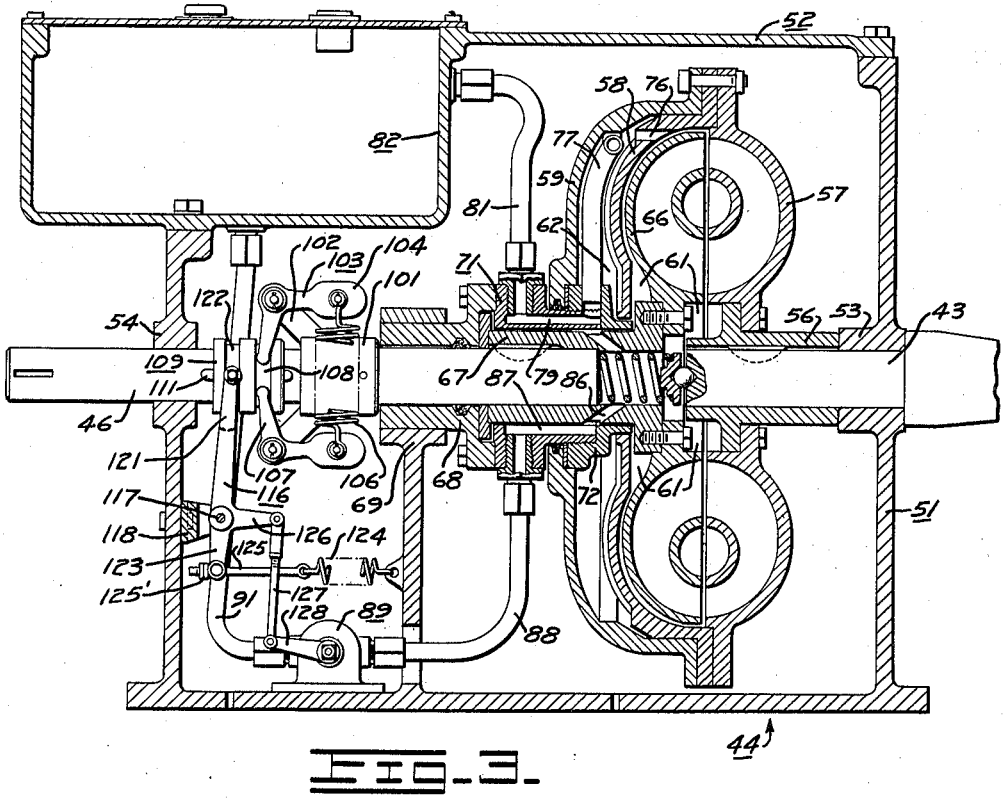
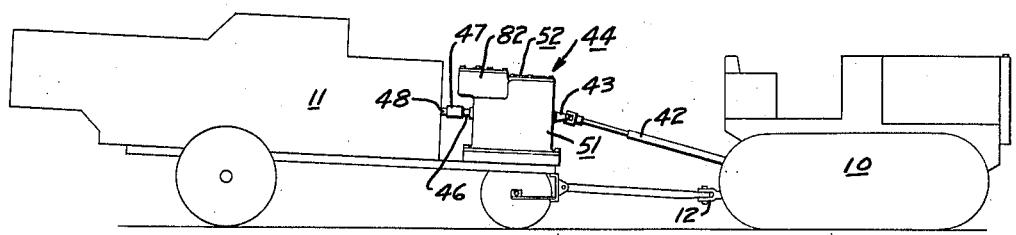
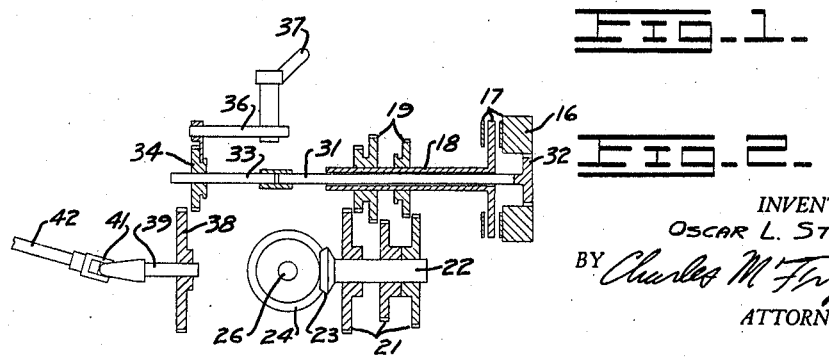
INVENTOR.
OSCAR L. STARR
BY Charles M Fryer
ATTORNEY.

Patented Aug. 4, 1936

2,049,673

UNITED STATES PATENT OFFICE 2,049,673

CONTROL MEANS FOR HARVESTERS OR THE LIKE OPERATING MECHANISM

Oscar L. Starr, Mission San Jose, Calif., assignor to Caterpillar Tractor Co., San Leandro, Calif., a corporation of California Application April 6, 1934, Serial No. 719,331

13 Claims. (Cl. 180—14)

The present invention relates to harvesters and the like, and more particularly to the provision of means for operating the harvesting mechanism from a source of power of variable speed.

In drawn vehicles, such as harvesters and the like, it is desirable to have a source of power which operates at a constant speed for driving the harvester mechanisms, such as the thresher cylinder, for example, from which other parts of the harvester including the separating mechanism and the pick-up, are usually driven. Heretofore, the drive for such parts has been provided by means of an auxiliary engine mounted on the harvester, as the engine of the draft vehicle could not be employed satisfactorily because of the fluctuations in speed thereof under the varying loads imposed thereon. The instant invention avoids the expense and extra work entailed in providing and caring for an auxiliary engine, by providing a drive connection from the engine of the draft vehicle, such as a tractor, which supplies a substantially constant speed drive for the harvester mechanism irrespective of the fluctuations in the speed of the engine of the draft vehicle.

It is, therefore, an object of the invention to provide in a harvester or like drawn vehicle having constant speed operating mechanism, means enabling operation of said mechanism from a source of power of variable speed.

Another object of the invention is to obviate the necessity of employing an auxiliary engine on a harvester or like vehicle.

Another object of the invention is to provide improved means for employing the engine of the draft vehicle for operating the mechanism on the drawn vehicle.

Another object of the invention is to provide an improved constant speed drive from a source of power of variable speed.

Another object of the invention is to provide an improved constant speed drive for mechanism of a vehicle, from the source of power which supplies the tractive force for the vehicle.

Another object of the invention is to provide an improved constant speed drive for mechanism on a drawn vehicle, from a source of power on the draft vehicle therefor.

Another object of the invention is to provide variable speed transmission means for driving the parts of a harvester or the like at a constant speed, from the engine of the draft vehicle therefor, irrespective of fluctuations in engine speed.

Another object of the invention is to provide an improved variable speed transmission arrangement which supplies a constant speed drive, irrespective of the variable speed drive transmitted thereto.

Other objects will appear as the description progresses.

Description of figures

Fig. 1 is a side schematic elevation of a vehicle train employing the instant invention.

Fig. 2 is a schematic view of the power transmitting mechanism of the draft vehicle.

Fig. 3 is a longitudinal vertical section through a hydraulic transmission which can be employed according to the instant invention.

Description of mechanism

The following description and the drawing illustrate one manner in which my invention can be employed. Broadly, my invention includes speed varying means in the form of a transmission which is automatically controlled to determine a substantially constant speed drive of the mechanism connected therewith, irrespective of normal fluctuations in engine speed of the prime mover. Preferably, the power take-off from a draft vehicle is connected directly to the engine thereof, to supply a drive independent of the engagement of the clutch and transmission gears which serve to drive the traction devices of the draft vehicle.

The train of vehicles (Fig. 1) includes tractor 10 and harvester 11, having a suitable draft connection 12. Tractor 10 includes an engine providing a source of power, which engine usually operates at a governed speed within a given range of fluctuations under load. The engine has flywheel 16 (Fig. 2) from which two drives are transmitted, one through suitable clutch and transmission means to the traction devices of the tractor, and the other a power take-off drive which is operable independently of the clutch and transmission drive. Flywheel 16 is connected by suitable clutch means 17 to tubular clutch driven shaft 18 having shiftable transmission gears 19 slidably and non-rotatably mounted thereon. Gears 19 are adapted to be selectively meshed with gears 21 fixed on shaft 22, to transmit a drive through bevel pinion 23 and bevel gear 24 to final drive shaft 26. Drive shaft 26 is connected through any suitable means to the traction devices of the tractor, as, for example, disclosed in the patent to Wickersham, No. 1,356,679, dated October 26, 1920.

Shaft 31 (Fig. 2) which has gear connection 32 with flywheel 16 at one end and extends through tubular shaft 18, being co-axial therewith, provides the power take-off shaft. At its opposite end, shaft 31 has a suitable drive connection with shaft 33 carrying gear 34 slidably and non-rotatably mounted thereon. Gear 34 is shiftable by means of shaft 36 and control lever 37, to mesh with gear 38 on shaft 39. Shaft 39 extends without the transmission case of the tractor at the rear end thereof, and has universal connection 41 with telescopic shaft 42 (Figs. 1 and 2). Shaft 42 (Fig. 2) extends rearwardly and is universally connected to drive shaft 43 of variable speed transmission 44.

As described later, transmission 44 is constructed and controlled to provide a constant speed drive for driven shaft 46 thereof irrespective of fluctuations of speed of drive shaft 43, which, as described above, is directly connected to the tractor engine. Shaft 46 has drive connection 47 (Fig. 1) with shaft 48 which extends rearwardly to drive the harvester mechanism. The havester construction may be of the type disclosed in the patent to Thoen, No. 1,831,208, dated November 10, 1931.

Variable speed transmission 44 may be of any suitable construction but is here shown as a hydraulic transmission of the type disclosed in the patent to Sinclair, No. 1,859,607, dated May 24, 1932. Only such parts of the transmission will be described as are necessary to an understanding of the operation thereof.

The transmission includes housing 51 (Fig. 3) having cover 52. Transmission drive shaft 43 and transmission driven shaft 46 are suitably journaled in respective axially aligned bosses 53, 54 of housing 51, and extend inwardly with their inner ends spaced apart. Drive shaft 43 is connected to impeller mechanism which has a hydraulic coupling with runner mechanism mounted on driven shaft 46. The ratio of the drive between shafts 43 and 46 is determined by the "slip" in the hydraulic coupling between the impeller and runner mechanisms, as described more specifically hereinafter; such slip being controlled by varying the amount of fluid flow through the hydraulic coupling.

Drive shaft 43 (Fig. 3) has sleeve 56 keyed thereon within housing 51, on which impeller member 57 is secured by suitable fastening means. To the outer periphery of impeller member 57, internal casing member 58 and external casing member 59 are suitably secured, adjacent their outer peripheries, for rotation therewith. Between impeller member 57 and inner casing 58, working chamber 61 of the hydraulic coupling is formed, while between internal casing member 58 and external casing member 59, withdrawal chamber 62 is provided. Within working chamber 61, runner member 66 is mounted on sleeve 67 suitably keyed on the inner end of driven shaft 46. Shaft 46 is supported adjacent its inner end in collar 68 suitably mounted in internal wall 69 of housing 51. Collar 68 is stationary, and has stationary sleeve member 71, suitably secured with respect thereto and positioned about rotatable sleeve 67. Collar 72 is threaded on the end of sleeve member 71 within withdrawal chamber 62 for a purpose later described.

From the foregoing description, it is seen that impeller member 57 and runner member 66 are mounted for relative movement with respect to each other, and with respect to sleeve member 71 and collar 72. Suitable seals are provided at the joints between said members as fully disclosed in the above noted patent. To provide for withdrawal of the fluid medium from the working chamber to the withdrawal chamber, a plurality of transverse apertures 76 are formed in internal casing member 58 adjacent the periphery thereof; only one aperture 76 being seen in Fig. 3. Within withdrawal chamber 62, tube 77 is positioned, having its outer open end positioned to receive fluid discharged through apertures 76. At its inner end, tube 77 is supported in collar 10 72 and communicates with passage 79 through sleeve 71 leading to conduit 81. Conduit 81 discharges into pressure tank 82 formed integrally with cover 52. To introduce fluid into working chamber 61, inner sleeve 67 has a plurality of apertures 86 which communicate with passage 87 in outer sleeve 71. Passage 87 also communicates with conduit 88 leading to valve 89 which is connected to the bottom of tank 82 by conduit 91.

In the arrangement of my invention, governor means are provided for automatically controlling the amount of fluid introduced from tank 82 to working chamber 61; so that shaft 46 can be driven at a substantially constant speed to drive the mechanism on the harvester at a substantially constant speed. For this purpose, collar 101 (Fig. 3) is suitably secured against axial movement on driven shaft 46 for rotation therewith, and has opposite arms 102 in which centrifugal fly-ball members 103 are pivoted. Ball portions 104 of members 103 are connected together by opposite parallel calibrated tension springs 106, only one of which is seen; and the opposite forked ends 107 of members 103 are disposed in annular groove 108 of collar 109. Collar 109 is slidably and non-rotatably mounted on shaft 46 by means of key 111. To connect collar 109 and valve 89, three-arm bell-crank lever 116 is pivoted at 117 in bracket 118 on housing 51. Upper forked end 121 of lever 116 engages groove 122 in collar 109, while lower short end 123 thereof is connected by a suitable adjustable link 125 to tension spring 124 which acts in the same direction as springs 106 described above. Link 125 is adjustably secured in end 123 by means of adjusting nuts 125'.

Intermediate forked end 121 and lower end 123 of lever 116, arm 126 extends outwardly at right angles thereto and is connected by adjustable rod 127 to control arm 128 of valve 89 which controls the flow of fluid through the system. The combined tension forces of springs 106, 124 is selected by preadjusting link 125 and by employing springs 106 of selected calibration, to balance the opposed centrifugal force of fly-ball members 103 when shaft 46 rotates at the desired constant speed. At this desired speed, valve 89 is adjustably set to determine the proper flow of fluid to working chamber 61 as described hereinafter. Should, for any reason, shaft 46 tend to rotate below or above the selected speed, the governor will move under the influence of the springs or the fly-balls as the case may be, to effect adjustment of valve 89. Valve 89 will thus allow more or less fluid to flow through the system to thereby compensate for the change in speed of shaft 46 and thereby hold the shaft at its constant speed.

The operation of the device is as follows:
When impeller member 57 is rotating, the fluid medium, which may be oil or water, is constantly passing by virtue of the centrifugal head thereof, at a predetermined rate, from working chamber 61 between impeller member 57 and runner member 66, to withdrawal chamber 62 via apertures or ports 76. By virtue of its impingement against the open end of tube 77, the fluid is ejected through tube 77, passage 79 and conduit 81, into tank 82, thereby serving to build up pressure in the tank. This loss of fluid medium from working chamber 61 is continuously replaced by virtue of the pressure in tank 82 causing the fluid to flow through conduit 91, valve 89, conduit 88, passage 87, and apertures 86 communicating with working chamber 61.

It will be seen that if the amount of loss is continuously made good so that a constant amount of the fluid medium is maintained in working chamber 61, the speed of runner member 66 will remain constant, as long as the speed of impeller member 57 remains constant. It is further seen that if valve 89 is manipulated to increase the amount of fluid discharged into working chamber 61 from tank 82, the speed of runner member 66 with relation to the speed of impeller member 57 will increase due to decreased slip therebetween. Conversely, if valve 89 is adjusted to decrease the flow of fluid medium from tank 82 to working chamber 61, the speed of runner member 66 decreases until pressure equilibrium is obtained. Thus, by manipulating valve 89, the speed of driven shaft 46 can be varied with respect to drive shaft 43. It will be noted, also, that any decrease in speed of drive shaft 43 or increase in speed thereof, which might be caused by load changes imposed on the prime mover, will result in a corresponding change in the speed of shaft 46.

With shaft 46 running at the desired constant speed, any increase in the speed thereof, due to increase in speed of shaft 43, will move governor fly-ball members 103 outwardly and collar 109 to the right along shaft 46. Thus, bell-crank 116 will rock in a clockwise direction to oscillate valve control arm 128 in a counter-clockwise direction, which serves to decrease the flow of fluid through valve 89. As the flow of fluid is decreased, the speed of runner member 66 will also decrease as described above. Conversely, if shaft 46 decreases in speed, due to a decrease in the speed of drive shaft 43, the governor fly-ball members 103 act through collar 109 and bell-crank 116 to oscillate valve control arm 128 in a clockwise direction to increase the flow of fluid through valve 89, so that additional fluid is supplied to working chamber 61 and the speed of driven shaft 46 is increased with respect to the speed of drive shaft 43. As a result, because of the automatic governor control for control element or valve 89, shaft 46 will be governed to run at a substantially constant speed.

Gear couplings of the type disclosed are built to operate with an efficiency of approximately 97 per cent for the most desirable results, so that the lowest speed of drive shaft 43 i. e., the lowest governed engine speed should be slightly higher than the constant speed desired for driven shaft 46. With this arrangement, the gear coupling has an ample range of speeds to accommodate the fluctuation in speed of drive shaft 43, while maintaining driven shaft 46 at the desired speed.

While I have described a preferred form of transmission to be employed with my invention, it is obvious that other types of variable speed transmissions can be utilized according to my invention. For example, a mechanical "Reeves" drive can be employed; and the speed of the driven power take-off shaft thereof can be governed automatically by a governor arrangement connected to the transmission to control automatically the speed change ratio thereof. Although in the preferred embodiment of my invention, I have illustrated the applicability thereof in connection with the operating mechanism on a harvester, it is apparent that the principle can be employed in connection with other drawn vehicles. For example, certain types of road machines, such as elevating graders and road cleaning vehicles, require a constant speed drive for the operating mechanism thereon for most advantageous operation.

I, therefore, claim as my invention:

1. The combination with a vehicle having mechanism adapted for substantially constant speed operation, and a draft vehicle therefor having a source of power of variable speed; of transmission means connected to said source of power and to said mechanism to drive said mechanism, and means influenced by speed fluctuations of the drive to said mechanism for automatically controlling operation of said transmission means to determine a substantially constant speed drive to said mechanism.

2. The combination with a vehicle having mechanism adapted for substantially constant speed operation, and a draft vehicle therefor having a source of power of variable speed; of a variable speed hydraulic transmission connected to said source of power and to said mechanism to drive said mechanism, an adjustable control member for said transmission, and governing means influenced by speed fluctuations of the drive to said mechanism and connected to said control member for maintaining substantially constant speed operation of said mechanism.

3. The combination with a vehicle having mechanism adapted for substantially constant speed operation, and a draft vehicle therefor having a variable speed source of power; of speed varying means between said mechanism and said source of power for maintaining a substantially constant speed drive for said mechanism irrespective of fluctuations in the speed of said source of power, and governing means influenced by speed fluctuations of the drive to said mechanism for controlling adjustment of said speed varying means.

4. The combination with a vehicle having mechanism adapted for substantially constant speed operation, and a variable speed source of power for supplying the tractive force for propelling said vehicle; of speed varying means interposed between said mechanism and said source of power for determining a substantially constant speed drive for said mechanism from said source of power, said speed varying means including an adjustable member for controlling the speed drive thereof, and governor means driven simultaneously with said mechanism and operatively connected to said member to control adjustment thereof.

5. The combination with a drawn vehicle having means adapted for substantially constant speed operation, and a draft vehicle therefor having a source of power of variable speed; of a variable speed transmission between said drawn vehicle means and said source of power, and governor means driven simultaneously with said drawn vehicle means and associated with said transmission for controlling operation thereof to supply a substantially constant speed drive from said source of power to said drawn vehicle means.

6. The combination with a drawn vehicle having means adapted for substantially constant speed operation, and a draft vehicle therefor having a source of power of variable speed; of transmission means between said drawn vehicle means and said source of power, a variable speed drive shaft for said transmission means and connected to said source of power, a shaft driven by said transmission means and connected to said drawn vehicle means, and control means associated with said driven shaft for controlling operation of said transmission means to maintain substantially constant speed operation of said driven shaft.

7. The combination with a drawn vehicle having mechanism adapted for substantially constant speed operation; and a draft vehicle having an engine, traction devices, and clutch and transmission means for driving said traction devices from said engine; of speed varying means, a drive connection from said engine to said speed varying means independent of said clutch and transmission means, a second drive connection from said speed varying means to said mechanism, and governor means driven by said second drive connection and operatively connected to said speed varying means to control the speed drive determined thereby.

8. The combination with a drawn vehicle having mechanism adapted for substantially constant speed operation, and a draft vehicle therefor having a source of power, of a transmission mounted on said drawn vehicle and having an adjustable element for controlling the speed ratio thereof, and means influenced by speed fluctuations of the drive to said mechanism and connected with said mechanism and with said element for adjusting said element automatically to maintain substantially constant the speed of said mechanism.

9. A harvester and the like vehicle having mechanism thereon adapted for substantially constant speed operation, and a transmission unit mounted on said vehicle, said unit including automatic speed change means influenced by speed fluctuations of the drive to said mechanism and connected with said mechanism for operating said mechanism at substantially constant speed.

10. In a vehicle having operable mechanism thereon; a source of power; and means for driving said mechanism from said source of power at a substantially constant speed irrespective of speed fluctuations of said source of power comprising a controllable-speed transmission device interposed between said source of power and said mechanism, and means influenced by speed fluctuations of the drive to said mechanism for automatically controlling the speed of the drive transmitted by said device to said mechanism.

11. In a vehicle having operable mechanism thereon; a source of power for propelling said vehicle; and means for driving said mechanism from said source of power at a substantially constant speed comprising a controllable-speed transmission device interposed between said source of power and said mechanism and having a drive transmitting member connected with said mechanism, and means associated with said device and including governor mechanism responsive to speed variations of the drive transmitted by said device for automatically controlling said device to maintain the speed of said member substantially constant.

12. In a vehicle having operable mechanism thereon, a source of power for propelling said vehicle, a drive connection from said source of power to said mechanism for driving said mechanism independently of the propulsion of said vehicle by said source of power and including a controllable-speed transmission device, and means influenced by speed fluctuations of the drive to said mechanism and associated with said device for maintaining the speed of said mechanism substantially constant irrespective of speed fluctuations of said source of power.

13. The combination with a vehicle having mechanism adapted for substantially constant speed operation, and a source of power for supplying the tractive force for propelling said vehicle; of transmission means connected to said source of power and to said mechanism to drive said mechanism, and governor means driven simultaneously with said mechanism for automatically controlling operation of said transmission means to determine substantially constant speed operation of said mechanism independent of speed fluctuations of said source of power.

OSCAR L. STARR.